Dec. 23, 1930.    H. FRÖHLICH    1,786,157
INDUCTION METER
Filed April 17, 1928
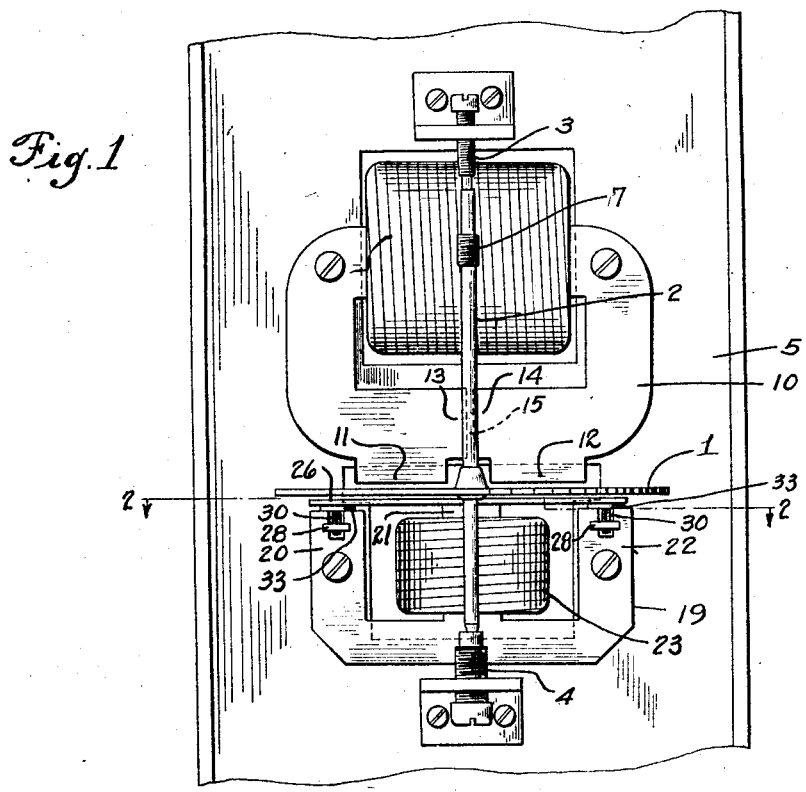
Fig. 1
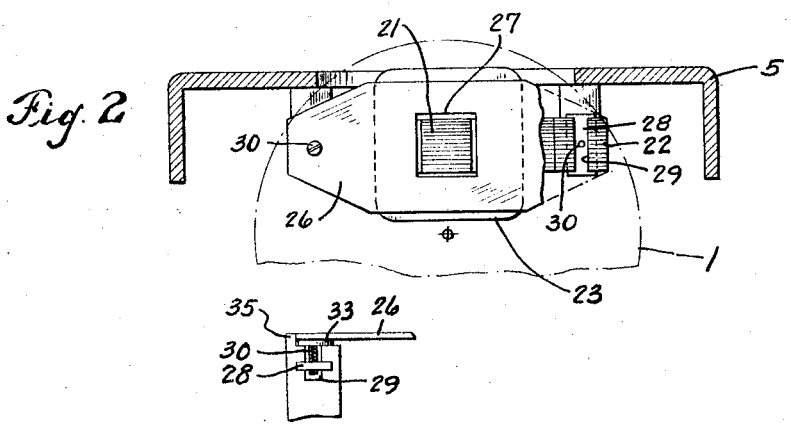
Fig. 2
Fig. 3
INVENTOR
Hans Fröhlich
BY John D. Morgan
ATTORNEY Patented Dec. 23, 1930

1,786,157

UNITED STATES PATENT OFFICE

HANS FRÖHLICH, OF ZUG, SWITZERLAND, ASSIGNOR TO LANDIS & GYR, A.-G., A JOINT-STOCK COMPANY OF SWITZERLAND, OF ZUG, SWITZERLAND

INDUCTION METER

Application filed April 17, 1928, Serial No. 270,666, and in Switzerland April 25, 1927.

The invention relates to induction meters and more particularly to novel and useful improvements in the driving system of such meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part thereof, illustrate one embodiment of the invention, and together with the description, serve to explain the principles of the invention.

Of the drawings:

Fig. 1 is an elevation of a meter mechanism embodying the invention;

Fig. 2 is a partial plan and horizontal section, taken substantially on line 2—2 of Fig. 1; and Fig. 3 is a fragmentary elevation of a modification.

The invention provides a novel and useful magnetic shunt circuit device cooperating with and constituting a part of the driving system of the meter.

In the illustrated exemplary embodiment of the invention, it is accordingly shown and described as applied to the meter disclosed in said copending application. Referring now in detail to said illustrated embodiment, a meter disc 1 is fixed on a spindle 2, which is journaled at its ends in adjustable bearings 3 and 4, fixed on a meter frame 5, which may be of any suitable construction. The spindle has a worm 7, or other suitable driving means for a register or like device.

A pressure core 10, preferably of general C-shape is mounted on the frame 5, and is provided with pole pieces 11 and 12, and a shunt circuit is provided through pole pieces 13 and 14, with a symmetrically positioned air gap 15 therebetween.

A current core 19 is located on the opposite side of the disc 1, and is suitably supported on the frame 5. As shown the core has three arms or pole pieces 20, 21 and 22, and a current coil 23 is wound about the arm 21.

The shunt member may be of various forms, so far as concerns the broader features of my invention, but as embodied it comprises a flat plate 26, preferably of reduced size at either end and having a medianly located aperture 27 in line with and preferably somewhat larger than the top of the center pole piece 21 of the current core.

This shunt plate or member is preferably mounted on the current core, and accordingly the tops or faces of pole pieces 20 and 22 are recessed as shown at 29, and in each of these recesses is fixed a stationary nut 28. This nut may be in the form of a plate or wedge with slightly tapered sides, fitting into corresponding transverse slots formed in the side walls of the recesses 29. If, after assembling, the narrow ends of the members 28 be upset, they will thus serve also as fastening means for the plates or laminations of the current core. As illustrated in the accompanying drawings, the shunt plate 26 and the pressure core 10 are so positioned relative to each other that the plate forms a counter pole for the pressure magnet.

The embodied fastening means for the shunt plate further comprise screws 30, passing through the plate 26 and threaded into the fixed nuts 28. Washers 33 of non-magnetic material are interposed between plate 26 and the tops of the corresponding core pole pieces. The central pole piece 21 is preferably longer than the others and projects through the aperture 27 with clearance thereabout, as shown in Fig. 2. Thus there is no contact between this pole piece and the shunt plate, and the entire face of the pole piece is unobstructed by the plate and the magnetic flux through the full face of the pole is unobstructed.

In Fig. 3 a modification is shown wherein the pole pieces 20 and 22 have outward projections 35 at their outer edges, the ends of plate 26 fitting therebetween, and thus any longitudinal displacement of plate 26 is further guarded against, if desired.

The invention in its broader aspects is not limited to the specific mechanisms shown and described but departures may be made therefrom within the scope of the accompanying claims without departing from the principles of the invention and without sacrificing its chief advantages.

What I claim is:—

1. An induction meter including in combination a meter disc, driving means therefor including pressure and current magnets and a shunt plate surrounding and spaced from one pole piece of the current magnet core and overlying and secured to another pole piece of the current magnet core, the pressure magnet being so positioned relative to the shunt plate that the plate forms a counterpole for the pressure magnet.

2. An induction meter including in combination a meter disc, and driving means therefor including a pressure magnet, a tri-polar current core, current coils for the core and a plate of magnetically conducting material secured to the outer pole pieces of the current core and apertured to surround the central pole piece of the current coil, said pressure magnet being so positioned relative to the shunt plate that the plate forms a counterpole for the pressure magnet.

3. An induction meter including in combination a meter disc and driving magnets therefor including a tri-polar current core, current coils for the core, a pressure core having two pole pieces positioned between and above the pole pieces of the current core, pressure coils for the pressure core, and a plate secured to a current pole piece and surrounding another pole piece of the current core to form a shunt plate for the current core and a counterpole for the pressure core.

In testimony whereof, I have signed my name to this specification.

HANS FRÖHLICH.